US006260566B1

(12) United States Patent
LaFave et al.

(10) Patent No.: US 6,260,566 B1
(45) Date of Patent: Jul. 17, 2001

(54) CANOPY FOR A CHILD'S WAGON

(76) Inventors: Shawn H. LaFave; Laura M. LaFave, both of 10316 Huntington Ave., Omaha, NE (US) 68122

(*) Notice: Subject to any disclaimer, the term of this patent is extended or adjusted under 35 U.S.C. 154(b) by 0 days.

(21) Appl. No.: 09/437,412

(22) Filed: Nov. 10, 1999

(51) Int. Cl.$^7$ .................................................. E04H 15/06
(52) U.S. Cl. ...................... 135/88.01; 135/96; 280/47.35; 280/87.01; 280/656; 297/184.15
(58) Field of Search ............................. 135/88.01, 88.09, 135/88.07, 88.15, 96, 121; 280/47.18, 47.35, 47.19, 87.01, 656; 297/184.13, 184.1, 184.15; 296/77.1

(56) References Cited

U.S. PATENT DOCUMENTS

| D. 388,473 | * | 12/1997 | Pasin et al. | D21/71 |
| 1,662,292 | * | 3/1928 | Bender | 280/47.35 |
| 3,698,409 | * | 10/1972 | Koontz et al. | 135/115 X |
| 4,234,203 | * | 11/1980 | Johnson | 280/47.35 X |
| 4,735,426 | * | 4/1988 | McConnell | 280/87.01 |
| 5,222,748 | * | 6/1993 | Johnson | 280/47.34 X |
| 5,560,383 | * | 10/1996 | Fuller | 135/88.01 |
| 5,975,613 | * | 11/1999 | Sippel | 297/184.13 |
| 6,079,719 | * | 6/2000 | Tisbo et al. | 280/47.35 |

* cited by examiner

Primary Examiner—Carl D. Friedman
Assistant Examiner—Winnie Yip
(74) Attorney, Agent, or Firm—Zarley, McKee, Thomte Voorhees & Sease; Dennis L. Thomte

(57) ABSTRACT

A canopy for a child's wagon including a canopy support structure selectively removably secured to the wagon and extending upwardly therefrom. A canopy is supported on the support structure for shading a child positioned in the passenger seating area of the wagon.

9 Claims, 5 Drawing Sheets

CANOPY FOR A CHILD'S WAGON

BACKGROUND OF THE INVENTION

1. Field of the Invention

This invention relates to a canopy for a child's wagon and more particularly to a canopy which may be removably positioned on a child's wagon.

2. Description of the Related Art

Children's wagons normally include a wheel-supported body portion having a tongue or handle extending from the forward end thereof with the body portion defining a passenger compartment in which the child sits. The open-topped conventional children's wagon does not provide any shelter or shade for the child.

SUMMARY OF THE INVENTION

A canopy is provided for use with a child's wagon having a passenger seating area defined by a forward end, a rearward end, and opposite sides. A canopy support structure comprised of a plurality of interconnectable frame members is selectively removably secured to the wagon and extends upwardly therefrom and across the top thereof. A canopy is supported on the support structure for shading a child positioned in the passenger seating area. More particularly, the canopy support structure includes an interiorally threaded socket secured to the body of the wagon at the four corners thereof. An elongated support member is secured to each of the sockets and extends upwardly therefrom. An elbow-connector is secured to the upper end of each of the elongated support members which support frame members extending therebetween. The canopy includes a top portion, a downwardly extending front portion, a downwardly extending rear portion, and downwardly extending side portions. Means is provided for maintaining the canopy on the canopy support structure. The canopy support is quickly and easily secured to the wagon and the canopy is quickly and easily mounted on the canopy support structure to offer shelter and shade for the child seated in the passenger seating area.

A principal object of the invention is to provide a canopy for a child's wagon.

Still another object of the invention is to provide a canopy for a child's wagon which may be quickly and easily installed on the wagon.

Still another object of the invention is to provide a canopy for a child's wagon which provides shelter and shade for the child seated in the passenger seating area of the wagon.

Still another object of the invention is to provide a canopy for a child's wagon including a canopy support structure comprised of a plurality of connectable frame members.

Still another object of the invention is to provide a canopy for a child's wagon including means for selectively maintaining a canopy on a support structure in various positions.

Yet another object of the invention is to provide a canopy for a child's wagon which is economical of manufacture, durable in use and refined in appearance.

These and other objects of the invention will be apparent to those skilled in the art.

DESCRIPTION OF THE PREFERRED EMBODIMENT

Figure 1:
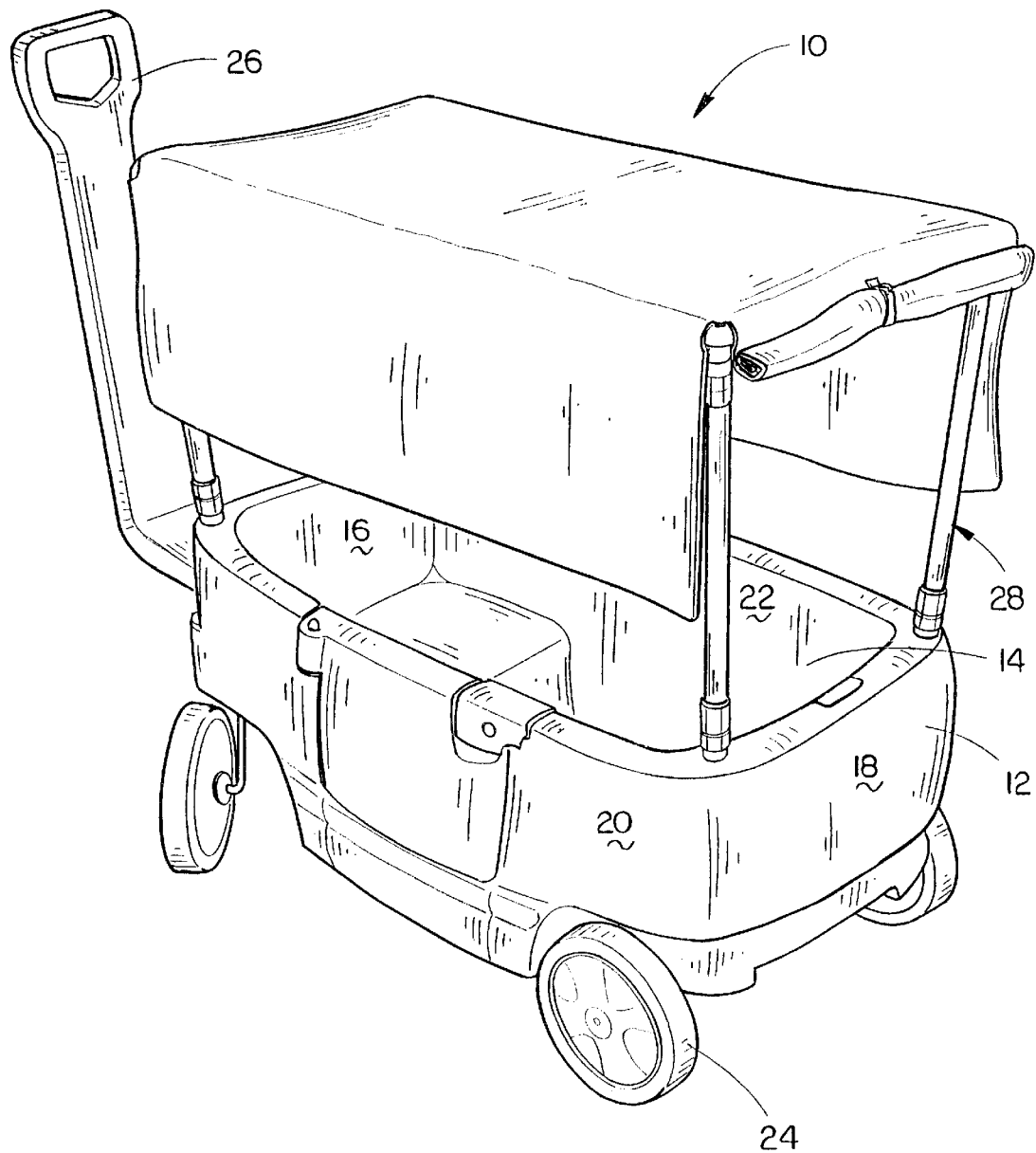
FIG. 1 is a perspective view of the canopy of this invention mounted on a wagon.

The canopy of this invention is referred to generally by the reference numeral 10 and is designed to be attached or supported on a child's wagon 12. For purposes of description, wagon 12 will be described as including a passenger seating area 14, defined by a front wall 16, rear wall 18, and opposite side walls 20 and 22. Wagon 12 is supported on wheels 24 in conventional fashion and has a forwardly extending tongue or handle 26. Although the wagon 12 illustrated in the drawings illustrates a passenger seating area wherein the child's feet are positioned below the seat, the canopy of this invention may be used on a conventional wagon.

The canopy is supported upon a canopy support structure referred to generally by the reference numeral 28. Support structure 28 includes interiorally threaded sockets 30, 32, 34 and 36 which are secured to the body of the wagon 12 at the four corners thereof by means of toggle bolts. Elongated tubular members 38, 40, 42 and 44 are threadably secured at their lower ends to the sockets 30, 32, 34 and 36, respectively, and extend upwardly therefrom. Elbow connectors 46, 48, 50 and 52 are secured to the upper ends of the tubular members 38, 40, 42 and 44, respectively.

Figure 2:
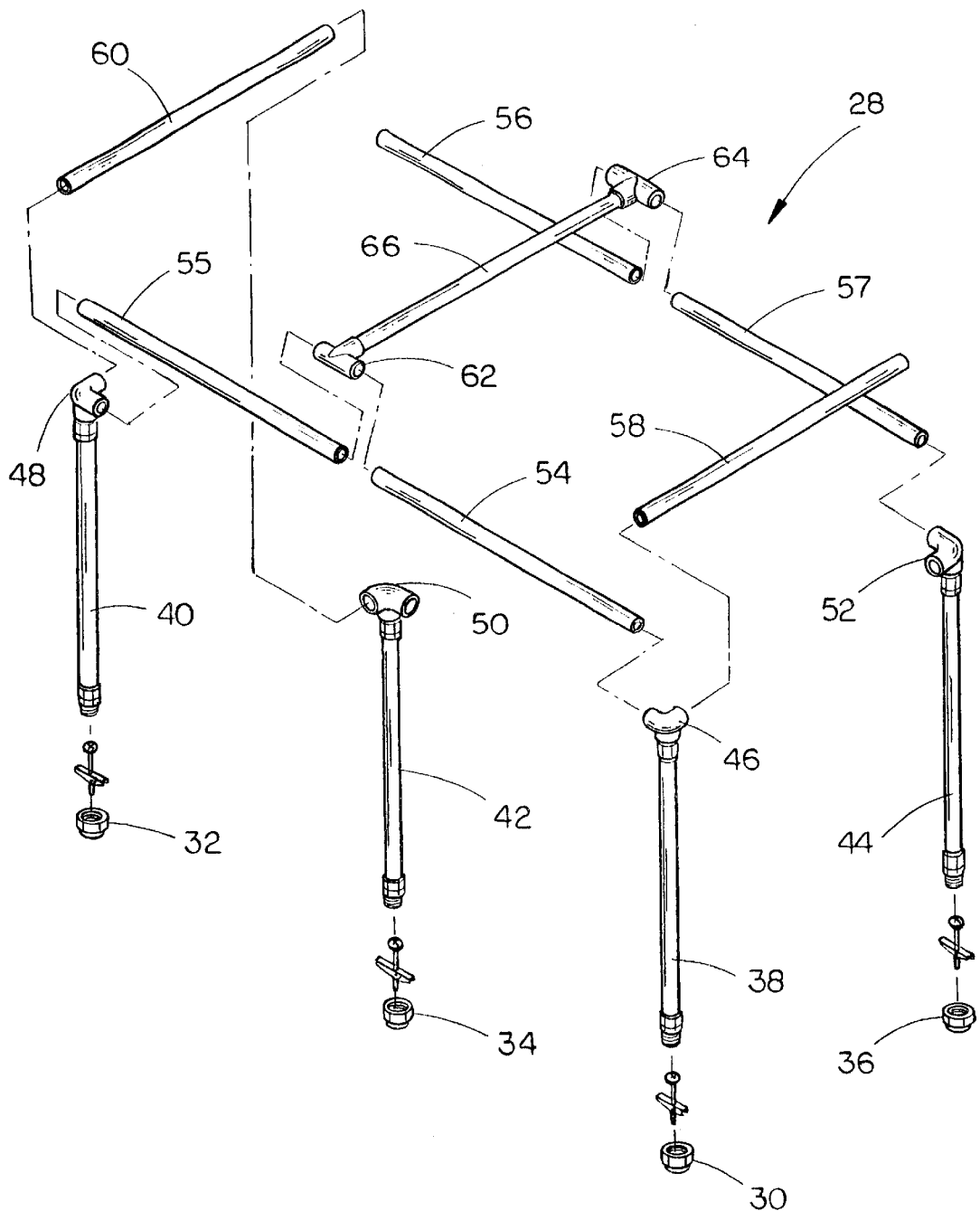
FIG. 2 is an exploded perspective view of the supporting structure for the canopy.
Figure 3:
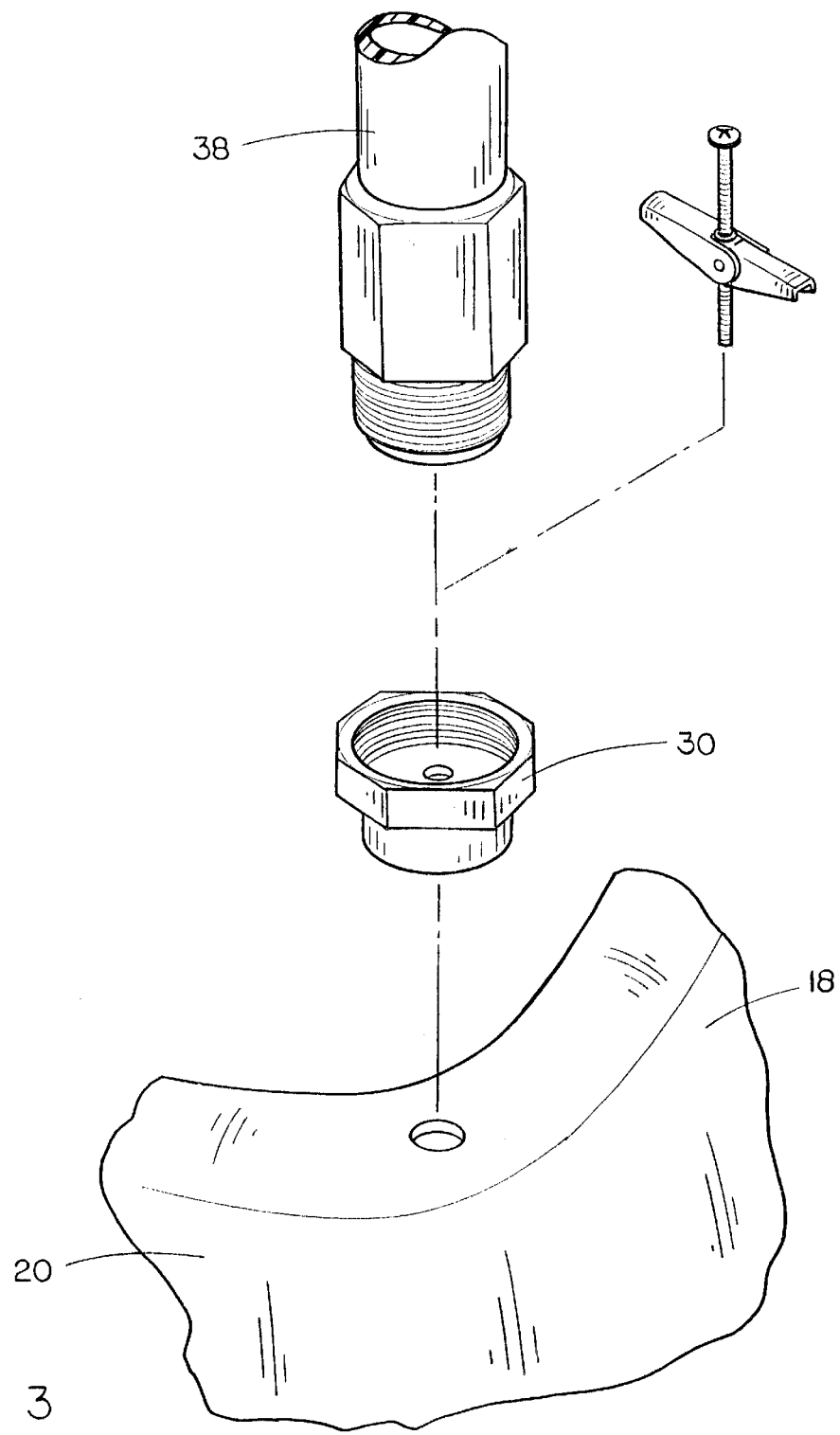
FIG. 3 is a perspective view illustrating the manner in which the vertical frame members are secured to the wagon.
Figure 4:
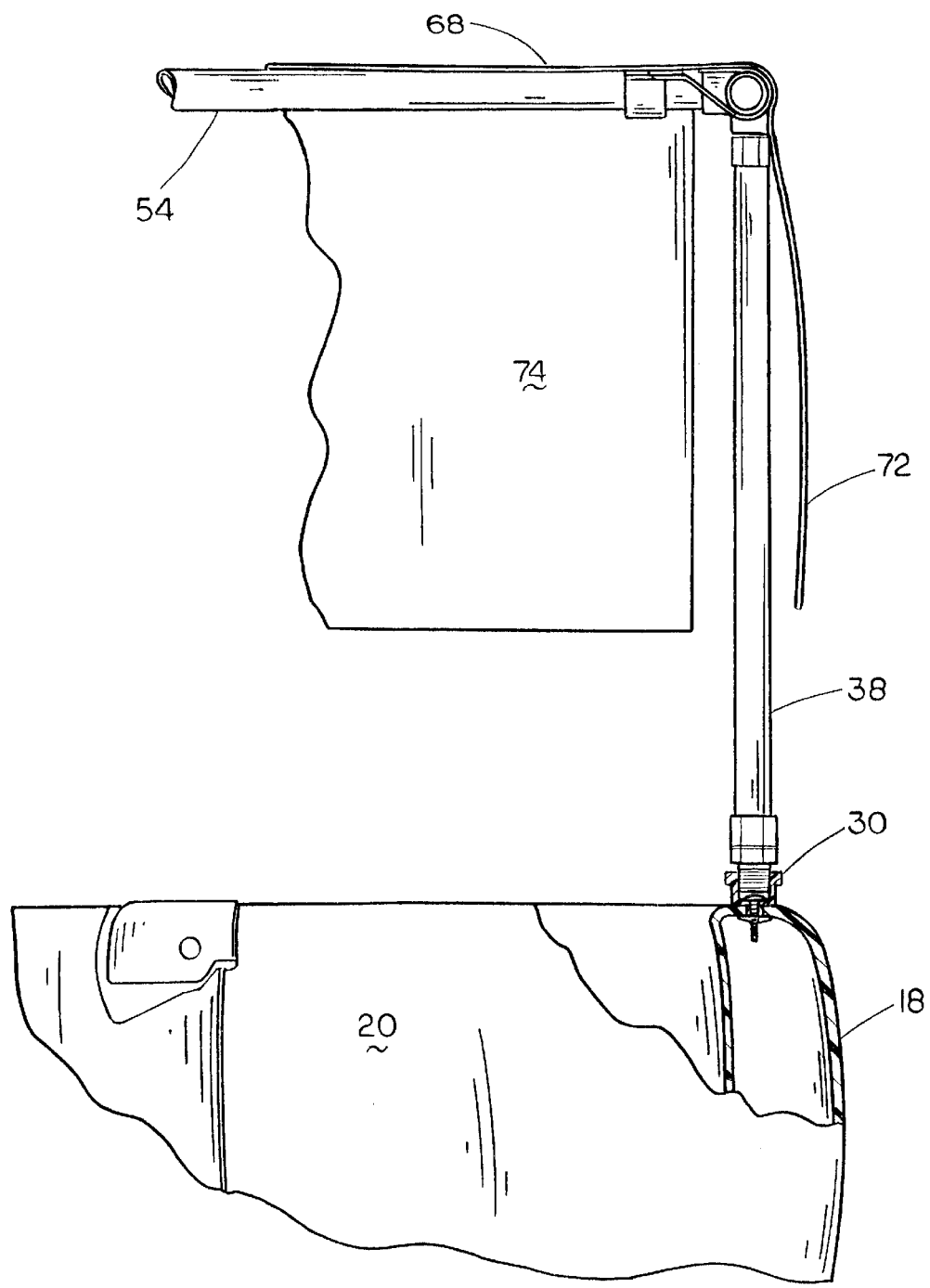
FIG. 4 is a partial side elevational view with portions thereof cut away to more fully illustrate the invention.

Tubular members 54 and 55 are removably secured to connectors 46 and 48, respectively, and extend therebetween towards one another while tubular members 56 and 57 are removably secured to connectors 50 and 52, respectively, and extend therefrom towards one another. Tubular member 58 is detachably secured to and extends between connectors 46 and 52, as illustrated in FIG. 2. Tubular member 60 is detachably secured to and extends between the connectors 48 and 50, as also seen in FIG. 2. T-connectors 62 and 64 are mounted on the tubular members 54–55 and 56–57, respectively, and have tubular member 66 extending therebetween, as also illustrated in FIG. 2.

Figure 5:
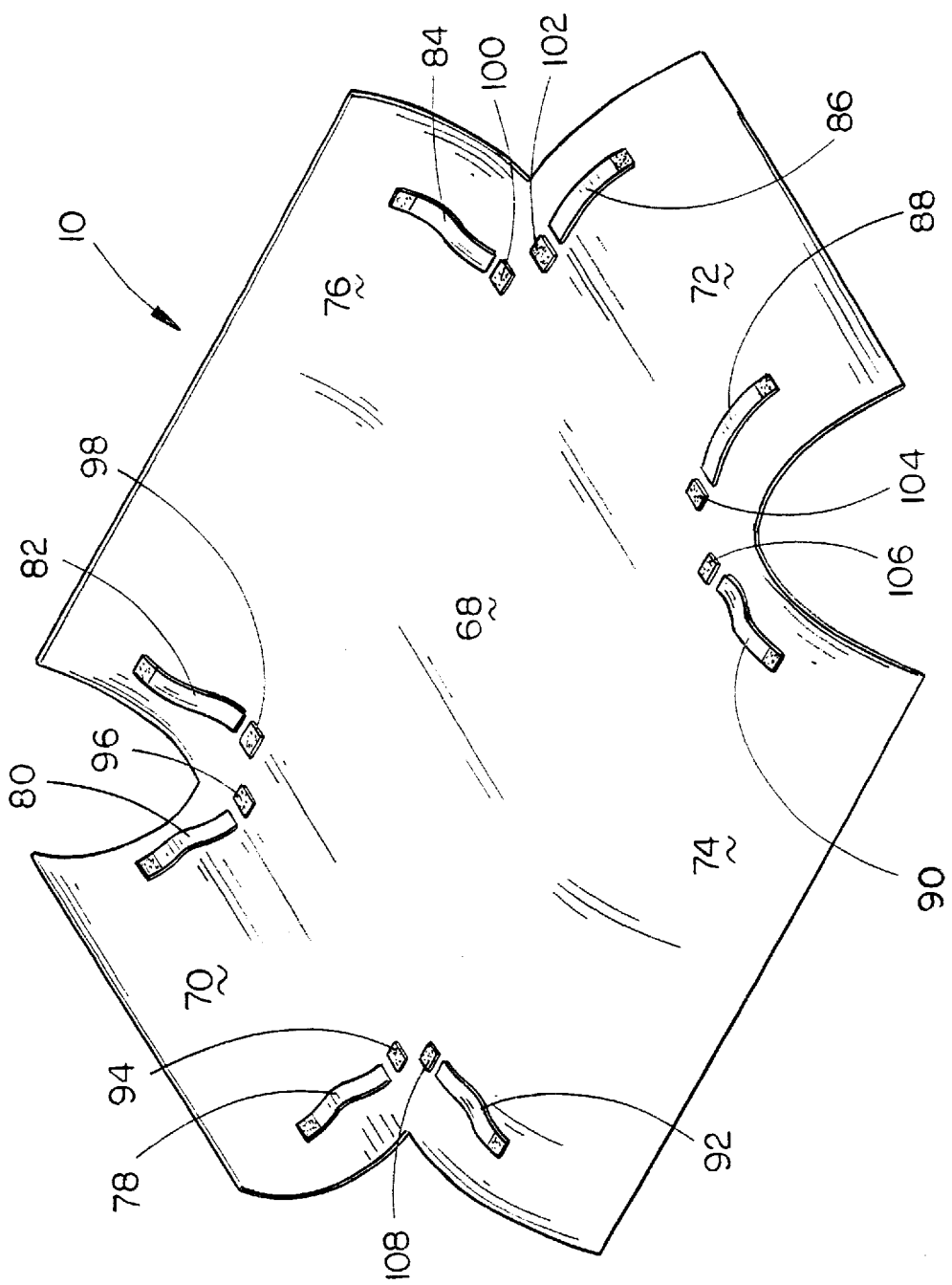
FIG. 5 is a bottom perspective view of the canopy.

Canopy 10 includes top portion 68, front flap portion 70, back flap portion 72 and opposite side flap portions 74 and 76. Straps 78 and 80, 82 and 84, 86 and 88, and 90 and 92 are secured to front flap portion 70, back flap portion 72, side flap portion 74 and side flap portion 76, respectively, as seen in FIG. 5. The straps 78, 80, 82, 84, 86, 88, 90 and 92 have loop fastener fabric associated therewith for connection to the hook fastener fabric strips 94, 96, 98, 100, 102, 104, 106 and 108, respectively, which are secured to the underside of top portion 68, as seen in FIG. 5. The straps are wrapped around the associated tubular member and secured to the respective strip to removably mount the canopy on the support structure 28.

The canopy support structure 28 may be easily secured to the wagon 12 by simply threadably securing the tubular members 38, 40, 42 and 44 to the sockets 30, 32, 34 and 36, respectively. Tubular member 60 is extended between the elbow connectors 48 and 50 and the tubular member 58 is extended between the elbow connectors 46 and 52. The T-connector 62 is mounted on the inner ends of the tubular members 54 and 55 and the T-connector 64 is secured to the inner ends of the tubular members 56 and 57. Tubular member 66, if not previously mounted in the T-connectors 62 and 64, is installed at this time. The forward end of tubular member 55 is secured to the elbow connector 48, the forward end of the tubular member 56 is secured to the elbow connector 50, the rearward end of tubular member 57 is secured to the elbow connector 52 and the rearward end of tubular member 54 is secured to the elbow connector 46.

The canopy 10 is then positioned over the framework and the straps 78–92 are secured to the strips 94–108, respectively. The canopy 10 provides shade and shelter to the child or children in the wagon, as illustrated in FIG. 1. If it is desired to roll up or raise one of the flaps in an upper position such as the back flap as illustrated in FIG. 1, suitable loop and hook fasteners may be provided thereon to maintain the flap in the rolled-up condition.

It can therefore be seen that a novel canopy has been provided for a child's wagon which is quickly and easily mounted on the wagon and which is quickly and easily removed therefrom.

Thus it can be seen that the invention accomplishes at least all of its stated objectives.

We claim:

1. In combination with a child's wagon having a passenger seating area defined by a forward end, a rearward end, and opposite sides, comprising:

a canopy support structure selectively removably secured to the wagon and extending upwardly therefrom;

said canopy support structure comprising: a plurality of interiorially threaded sockets secured to the wagon; an elongated upstanding member threadably secured to end of each of said upstandingmembers; and horizontally extending members removably secured to and extending between said connectors;

and a canopy supported on said support structure for shading a child positioned in the passenger seating area.

2. The combination of claim 1 wherein said canopy comprises: a horizontally disposed top canopy portion having a forward end, a rearward end, and opposite sides; a front canopy portion extending downwardly from the forward end of said top canopy portion; a rear canopy portion extending downwardly from the rearward end of said top canopy portion; and opposite side portions extending downwardly from the opposite sides of said top canopy portion.

3. The combination of claim 1 wherein said canopy is constructed of a flexible material.

4. The combination of claim 2 wherein said canopy is constructed of a flexible material.

5. The combination of claim 2 including means for selectively maintaining said front, rear, and opposite side canopy portions in their downwardly extending position.

6. The combination of claim 5 further including means for maintaining said front, rear, and opposite side canopy portions in a raised position.

7. The combination of claim 1 wherein said canopy is secured to said horizontally extending members.

8. The combination of claim 1 wherein said horizontally extending members define a forward support, a rearward support, and opposite side supports.

9. The combination of claim 8 wherein a cross-support extends between said opposite side supports.

\* \* \* \* \*